United States Patent [19]
Denz et al.

[11] Patent Number: 5,074,270
[45] Date of Patent: Dec. 24, 1991

[54] METHOD FOR PROTECTING A CATALYZER

[75] Inventors: Helmut Denz, Stuttgart; Ernst Wild, Oberriexingen; Rudi Mayer, Vaihingen/Enz, all of Fed. Rep. of Germany

[73] Assignee: Robert Bosch GmbH, Stuttgart, Fed. Rep. of Germany

[21] Appl. No.: 644,011

[22] Filed: Jan. 22, 1991

[30] Foreign Application Priority Data

Jan. 26, 1990 [DE] Fed. Rep. of Germany ....... 4002206

[51] Int. Cl.$^5$ ................. F01N 9/00; F01N 3/18; F02D 41/22; F02D 43/00
[52] U.S. Cl. .................... 123/479; 60/274; 60/277; 123/198 D
[58] Field of Search ............ 123/479, 198 D; 73/119 A; 60/274, 277

[56] References Cited

U.S. PATENT DOCUMENTS

| | | | |
|---|---|---|---|
| 4,036,196 | 7/1977 | Hamilton | 123/364 |
| 4,192,140 | 3/1980 | Yamashita et al. | 60/285 |
| 4,319,451 | 3/1982 | Tajima et al. | 60/274 |
| 4,467,757 | 8/1984 | Dazzi | 123/198 D |
| 4,499,876 | 2/1985 | Yamamoto | 123/479 |

Primary Examiner—Tony M. Argenbright
Assistant Examiner—Robert F. Mates
Attorney, Agent, or Firm—Walter Ottesen

[57] ABSTRACT

The invention is directed to a method for protecting a catalyzer against overheating. The method includes the steps of checking whether an injection valve no longer correctly closes by means of a conventional diagnostic process. If the condition is present that an injection valve no longer correctly closes, the air/fuel mixture for all cylinders is enriched and an overrun switchoff is inhibited. The method leads to the condition that in all load ranges, the oxygen quantity reaching the catalyzer is limited so that no damaging afterburning can take place. In this way, the catalyzer is protected against overheating and the affected vehicle is not disabled.

1 Claim, 1 Drawing Sheet

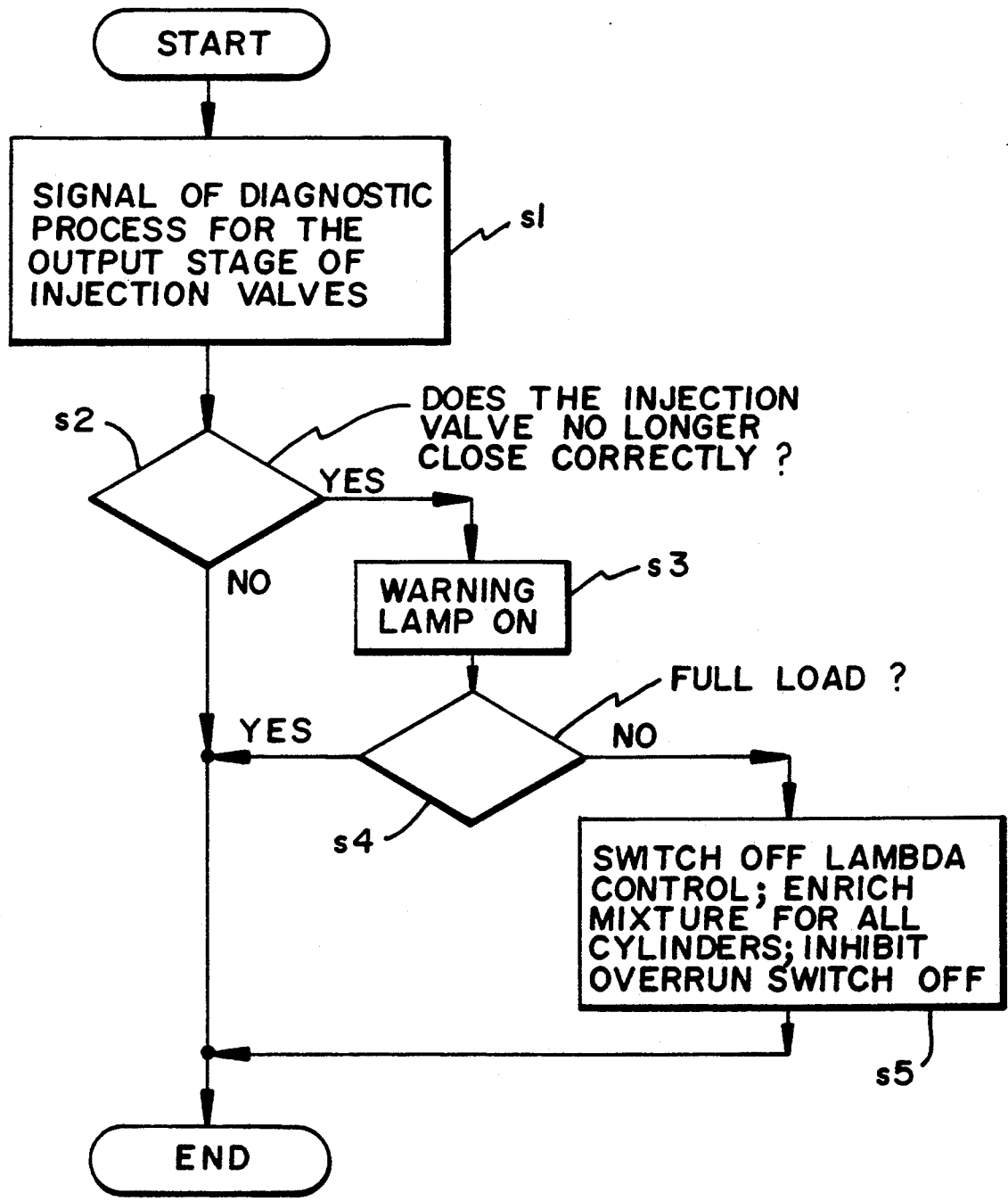

METHOD FOR PROTECTING A CATALYZER

FIELD OF THE INVENTION

The invention relates to a method for protecting a catalyzer against overheating which occurs when uncombusted fuel together with air reaches the catalyzer. This condition occurs, for example, when an injection valve for a cylinder no longer closes correctly. The lambda probe then shows that the engine is being driven with a mixture which is overall too rich. This then causes a leaning of the mixture in the cylinders wherein the injection valve operates correctly. Overall, this sequence has the consequence that fuel in excess comes from the cylinder having the defective valve while air in excess comes from the other cylinders. When this excess is burned in the catalyzer, the catalyzer can become so warm that it is destroyed and under appropriate circumstances even the vehicle in which the catalyzer is mounted can be set on fire.

BACKGROUND OF THE INVENTION

In order to effectively counteract defects of the kind described above, numerous electronic engine controls have diagnostic methods for checking the drive output stage of the injection valve. If the diagnosis provides the result that an injection valve no longer can be closed, then the fuel pump is switched off in arrangements known in the state of the art. This has the serious disadvantage that the affected vehicle becomes disabled. A further disadvantage is that the residual fuel in the lines can continue to be injected and this residual amount can be sufficient for destroying the catalyzer.

SUMMARY OF THE INVENTION

In view of the above, it is an object of the invention to provide a method wherein the catalyzer is not destroyed when the injection valve for a cylinder no longer correctly closes. It is another object of the invention to provide such a method wherein the vehicle affected does not become disabled.

The method according to the invention for protecting a catalyzer against overheating includes the steps of: checking whether an injection valve no longer closes utilizing a diagnostic process; and then, enriching the air/fuel mixture for all cylinders when an injection valve no longer closes.

This measure assures that, at high load, all the oxygen in the cylinders is combusted and, in any case, as long as no combustion misses occur. In this way, the catalyzer is reliably protected against overheating. The affected engine can continue to be operated. However, a warning lamp is advantageously energized in order to indicate to the driver that an operating defect is present.

At part load, and especially in the lower part-load range, the condition can occur that the mixture for a cylinder becomes too greatly enriched because of a continuously opened injection valve such that the mixture can no longer be ignited.

Since the catalyzer temperature is lower at lower loads, the combustion of the mixture of a cylinder in the catalyzer leads to an increase in the catalyzer temperature. This temperature however remains below the critical limit.

BRIEF DESCRIPTION OF THE DRAWING

The single figure of the drawing shows a flowchart for explaining the method according to the invention for protecting a catalyzer against overheating.

DESCRIPTION OF THE PREFERRED EMBODIMENTS OF THE INVENTION

In the method according to the flowchart of the drawing, the signal of a conventional diagnostic process for the output stage of injection valves is called up in step s1. The conventional output stage diagnosis supplies the information that an injection valve is either continuously open or can no longer be opened. The explanation which follows is directed to the condition wherein the injection valve is continuously opened.

In step s2, an inquiry with respect to the above-mentioned case is made, that is, whether an injection valve no longer correctly closes. If this is not the case, then all injection valves can be properly closed and the method is ended.

If however in step s2, there occurs the condition that an injection valve no longer correctly closes, then in step s3, a warning lamp is energized. In step s4, an investigation is conducted as to whether the affected engine is operated at full load. At full load, the lambda control is switched off and the engine is driven by a control such that the mixture for all cylinders is rich. This rich mixture is further enriched for the affected cylinder because of the defective injection valve. However, this in no way endangers the catalyzer since this does not change anything with respect to the fact that all oxygen already has been combusted in the cylinders so that no oxygen is available for combustion in the catalyzer with the excess fuel. The method is therefore ended. As in all engine control routines, the method is again called up at short time intervals.

If in step s4, there is no operation present wherein all cylinders are already driven with a rich mixture, then a drive of this kind occurs in step s5. In the event that a lambda control has taken place previously, the lambda control is switched off. The metering of fuel takes place with the aid of precontrol values for the lambda control. The precontrol values are at injection duration values when switched off because of the adaptation conventional with lambda control. These values essentially lead to the lambda value 1. These precontrol injection durations are multiplied by a factor $>1$ such as by a factor lying in the range of 1.1 to 1.15.

The measure described above is initiated even for the drive duration of the defective injection valve. The injection valve therefore injects in the phase in which it is driven to open and supplies fuel continuously also in the phase in which it is intended to actually be closed. The defective injection valve injects then more fuel than would be the case for correct operation. The injection valve must not be continuously driven to "closure" since this would lead to a lean mixture, namely, then when the injection valve leaks only slightly. Then the affected cylinder would operate with an excess of oxygen while the other cylinders would be driven with an excess of fuel. This would lead directly to the danger of an overheating of the catalyzer because of the combustion of the excessive materials in the catalyzer.

At relatively high load but not in a load range which would lead from step s4 to step s5, so much air is, as a rule, available that even a mixture can be ignited which was generated by a defective injection valve during continuous full injection. Especially in the lower part-load range, the condition can occur that the overenrichment becomes too great so that the mixture no longer ignites. In this case, the uncombusted oxygen reaches the catalyzer and there reacts with the excess fuel coming from all cylinders.

A high operational reliability is obtained with the method described above. This is the case because in the upper load ranges, combustion takes place in all cylinders continuously so that no excess oxygen is present with which the fuel, which is definitely present in excess because of the enrichment of the mixture, can combust. In the lower part-load range, ignition misses can occur and therefore uncombusted mixture components can combust in the catalyzer; however, in the lower part-load range, the catalyzer temperature is, as a rule, so low that no danger of overheating of the catalyzer and therefore no danger of fire is present.

The sequence of the method steps thereby assures that a vehicle does not become disabled when an injection valve can no longer be closed and no danger of damage for the catalyzer or even the vehicle exists when continuing to operate the affected vehicle.

It is understood that the foregoing description is that of the preferred embodiments of the invention and that various changes and modifications may be made thereto without departing from the spirit and scope of the invention as defined in the appended claim.

What is claimed is:

1. A method for protecting a catalyzer from overheating, the method comprising the steps of:
   using a diagnostic process to check if an injection valve no longer correctly closes; and,
   when the diagnostic process shows that an injection valve no longer correctly closes, enriching the air/fuel mixture for all cylinders and inhibiting overrun switchoff.

* * * * *